(12) United States Patent
Murakami

(10) Patent No.: US 8,055,279 B2
(45) Date of Patent: Nov. 8, 2011

(54) TRANSMISSION CONTROL METHOD AND DEVICE

(75) Inventor: Hirokazu Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 11/802,155

(22) Filed: May 21, 2007

(65) Prior Publication Data

US 2008/0026758 A1  Jan. 31, 2008

(30) Foreign Application Priority Data

Jul. 28, 2006  (JP) .................................. 2006-206941

(51) Int. Cl.
*H04W 24/00* (2009.01)

(52) U.S. Cl. ................ 455/456.6; 455/456.1; 455/404.2; 455/414.2; 455/440; 455/232.1; 455/238.1; 455/441

(58) Field of Classification Search ................ 455/238.1, 455/440, 414.2, 456.1, 232.1, 441, 404.2, 455/456.6
See application file for complete search history.

(56) References Cited

U.S. PATENT DOCUMENTS

| | | | | |
|---|---|---|---|---|
| 5,872,526 | A * | 2/1999 | Tognazzini | 340/961 |
| 6,249,682 | B1 * | 6/2001 | Kubo et al. | 455/522 |
| 6,317,587 | B1 * | 11/2001 | Tiedemann et al. | 455/69 |
| 7,120,439 | B2 * | 10/2006 | Freiha | 455/441 |
| 2005/0058151 | A1 * | 3/2005 | Yeh | 370/445 |
| 2007/0259659 | A1 * | 11/2007 | Bennett | 455/422.1 |

FOREIGN PATENT DOCUMENTS

| | | |
|---|---|---|
| JP | 2004206624 | 7/2004 |
| JP | 2004-328394 | 11/2004 |

OTHER PUBLICATIONS

Japanese Notification of Reasons for Refusal dated May 10, 2011 for application No. 2006-206941.

* cited by examiner

*Primary Examiner* — Kamran Afshar
*Assistant Examiner* — Khalid Shaheed
(74) *Attorney, Agent, or Firm* — Murphy & King, P.C.

(57) ABSTRACT

When information of its own station is transmitted to another mobile station by a CSMA access method, by a transmission control method and device, moving speed information and location information is transmitted with a predetermined minimum transmission power until a moving speed of its own station exceeds a first threshold, and the moving speed information and the location information is transmitted with a first transmission power proportional to the moving speed when the moving speed of its own station exceeds the first threshold. In this case, moving direction information of its own station may be acquired and transmitted in addition to the moving speed information and the location information. If the moving speed of the other mobile station exceeds a second threshold higher than the first threshold and a moving direction of the other mobile station is an approaching direction to its own station while its own station is not making transmission with the moving speed of its own station exceeding the first threshold, the first transmission power is switched over to a second transmission power proportional to the moving speed of the other mobile station and the moving speed information and the moving direction information is transmitted.

6 Claims, 9 Drawing Sheets

TRANSMISSION CONTROL METHOD AND DEVICE

BACKGROUND OF THE INVENTION

1. Field of the Invention

The present invention relates to a transmission control method and device, and in particular to a transmission control method and device in mobile stations which mutually notify their own information by using a CSMA method without interposition of a master station in order to prevent a collision between the mobile stations.

2. Description of the Related Art

When communication is performed by the CSMA method, a mobile station has performed a carrier sense before making data transmissions, thereby confirming whether or not data from other mobile stations exists in the air to make data transmissions of its own station when determining that no data from other mobile stations exists. The transmissions have been made with the same power enough to cover a communication area determined as a system for all of the mobile stations.

While there are some CSMA methods, one example of them will now be described referring to FIG. 7 which is a diagram showing the concept and FIG. 8 which shows a data transmission flow in each mobile station. It is to be noted that while by a normal CSMA method a data receiving side returns an ACK signal for confirming that data has arrived, a broadcast communication is presumed in the case of FIG. 7, so that no ACK signal is used.

Time T1: A mobile station MS2 receives a data transmission request from an upper layer, and performs a carrier sense upon data transmission (at step S32). At this time, since a carrier is sensed due to a data transmission of a mobile station MS1, the carrier sense is continued until no carrier is sensed (at step S33).

The mobile station MS2 has determined to make transmission at the timing of a time T1 based on a result of sole determination of random transmission timing by the mobile station MS2 (at step S31). Other mobile stations may perform a carrier sense for transmission at the same timing.

Time T2: Detecting that transmission data of the mobile station MS1 has been completed (at step S34), the mobile station MS2 starts up a timer of fixed waiting time (at step S35).

Time T3: Since the fixed waiting time in the mobile station MS2 is up (at step S36), the mobile station MS2 starts up a random timer at this point (at step S37).

Time T4: Having received the data transmission request from the upper layer, the mobile station MS3 performs a carrier sense for the data transmission (at step S32). Since having found that there is no carrier as a result of the carrier sense (at step S33), the mobile station MS3 starts up the timer of fixed waiting time (at step S35).

Time T5: The random time in the mobile station MS2 is up (at step S38). Then, the mobile station MS2 performs the carrier sense again (at step S39). Having detected no carrier transmitted by another mobile station (at step S40), the mobile station MS2 starts its data transmission (at step S41).

Time T6: Since the fixed waiting time which started at the time T4 is up (at step S36), the mobile station MS3 starts up the random timer (at step S37).

Time T7: Since the random time in the mobile station MS3 is up (at step S38), the mobile station MS3 performs the carrier sense (at step S39). In the presence of transmission data of the mobile station MS2, the mobile station MS3 detects the carrier. Then, the carrier sense is continued until no carrier is sensed (at step S33).

Time T8: After the completion of the data transmission of the mobile station MS2 and the detection of absence of carrier by the mobile station MS3 (at step S34), the mobile station MS3 starts up the fixed timer again at this point (at step S35).

Time T9: Since the fixed time in the mobile station MS3 is up (at step S36), the mobile station MS3 starts up the random timer (at step S37), where the maximum value of the random timer time at this time is gradually reduced in inverse proportion to the number of start-ups until the data transmission.

Time T10: Since the random time in the mobile station MS3 is up (at step S38), the mobile station MS3 performs the carrier sense again (at step S39), which results in the detection of absence of carrier (at step S40), so that the data is transmitted (at step S41).

It is to be noted that there is a base station device and a transmission power control method in which the base station device is provided with a transmitting device which transmits wireless transmission data, a transmission power control circuit which controls a transmission power of the transmitting device, a receiving device which receives the wireless transmission data from a mobile device and generates reception data, and a retransmission detecting circuit which detects a retransmission request included in the reception data. The transmission power control circuit is provided with an initial transmission power controller which increases the transmission power of the transmitting device step-by-step from a transmission power initial value predetermined in an initial period of the transmission start according to the retransmission request and stops the increase of the transmission power when the retransmission detection circuit detects no retransmission request.

[Patent document 1] Japanese Patent Application Laid-open No. 2004-328394

However, when the communication according to the above-mentioned CSMA method is performed and each moving speed of the mobile stations within the same communication area is low, numerous mobile stations will concurrently exist in a single communication area. Conversely, when numerous mobile stations exist within the communication area, it is natural that the mobile stations move at a low speed. In this case, the packet occupancy in the air is increased, and "carrier presence" is indicated in almost all time zones even when the carrier sense is performed, so that a time zone during which a packet can be transmitted by its own station can not be found. Eventually, a collision between the mobile stations is induced. This will be specifically described by referring to FIGS. 9A and 9B.

It is supposed that ten mobile stations MS1-MS10 exist, and that there is only a time for transmitting transmission packets of ten mobile stations MS1-MS10 in a single frame in order to simplify the description. Also, it is supposed that transmission is being made with the maximum power so that all of the mobile stations MS1-MS10 may cover a maximum required communication area as shown in FIG. 9A.

Although the moving speeds of the mobile stations MS1-MS10 are different from each other (the moving speed of only the mobile station MS4 is high) in the prior art method, all of the mobile stations transmit with the same transmission power, so that the same communication area is formed. When a mobile station MS11 newly appears and performs a carrier sense for transmitting its own data as shown in FIG. 9B, there is found no "vacancy" in the packet occupation status in the air at the position of the mobile station MS11, and "carrier presence" is indicated, so that a transmission chance is not be provided. Accordingly, there is a possibility that a collision between the mobile stations may be induced.

SUMMARY OF THE INVENTION

It is accordingly an object of the present invention to provide a transmission control method and device by which a chance of a carrier sense is provided to as many mobile stations as possible within the same communication area when information of its own station is transmitted to another mobile station by a CSMA access method, and the mobile stations form only a necessary communication area for avoiding the collision.

In order to achieve the above-mentioned object, a transmission control method (or device) according to the present invention transmitting information of its own station to another mobile station by a CSMA access method comprises: a first step (or means) of acquiring and holding moving speed information and location information of its own station; and a second step (or means) of transmitting the moving speed information and the location information with a predetermined minimum transmission power until a moving speed of its own station exceeds a first threshold, and of transmitting the moving speed information and the location information with a first transmission power proportional to the moving speed when the moving speed of its own station exceeds the first threshold.

The above-mentioned first step (or means) may include a step (or means) of acquiring and holding moving direction information of its own station in addition to the moving speed information and the location information, and the second step (or means) may include a step (or means) of transmitting the moving direction information in addition to the moving speed information and the location information, the method may further comprise a third step (or means) of receiving and holding moving speed information and moving direction information of the other mobile station, and a fourth step (or means) of switching the first transmission power to a second transmission power proportional to a moving speed of the other mobile station, and of transmitting the moving speed information and the moving direction information if the moving speed of the other mobile station exceeds a second threshold higher than the first threshold and a moving direction of the other mobile station is an approaching direction to its own station while its own station is not making transmission with the moving speed of its own station exceeding the first threshold.

Also, the transmission control method (or device) may further comprise a fifth step (or means) of transmitting the moving speed information and the moving direction information with the first transmission power when the moving direction of the other mobile station is not an approaching direction to its own station and even if the moving speed of the other mobile station is equal to or more than the second threshold.

Furthermore, the transmission control method (or device) may further comprise a sixth step (or means) of increasing a transmission power in a slope fashion upon switchover from the first transmission power to the second transmission power.

The present invention as mentioned above will now be illustrated referring to FIGS. 1A and 1B.

Firstly, since a mobile station MS3 among all of the mobile stations MS1-MS10 has not yet entered an area where it can receive information of any other mobile station, it transmits moving speed information and location information of the mobile station MS3 with a predetermined minimum power in case the moving speed≦the first threshold. When the moving speed has become higher than the first threshold (the moving speed>the first threshold), the mobile speed information and the location information of the mobile station MS3 is transmitted with the first transmission power proportional to the acquired moving speed of the mobile station MS3 (at step S1).

Accordingly, another mobile station having received the moving speed and the location information of the mobile station MS3 recognizes the location and the moving speed of the mobile station MS3 and can recognize a risk of a collision by the prior art CSMA method.

However, since the mobile station MS3 is not located in a receiving area of information from the mobile station MS4 which is moving at a high speed in the approaching direction, the first transmission power is small, the communication area is narrow, and a sufficient communication area required for avoiding the collision is formed (at step S1).

Since the traveling directions of the mobile stations MS5-MS10 and the mobile station MS4 are not mutually approaching directions while the mobile station MS5-MS10 receive data transmitted from the mobile station MS4 which is moving at a high speed, the mobile station MS5-MS10 make data transmission with the first transmission power (at step S2) in this case as well, the communication area is narrow, and the sufficient communication area required for avoiding the collision is formed.

On the other hand, since the mobile stations MS1 and MS2 moving at a low speed are mutually approaching to the mobile station MS4 moving at a high speed, the mobile stations MS1 and MS2 transmit the moving speed information and the moving direction information of their own with a second transmission power even if the moving speed of their own is low (at step S3). Therefore, the communication area becomes wide, information of their own arrives at the mobile station MS4, and the sufficient communication area required for avoiding the collision is formed.

When a mobile station MS11 moving at a low speed newly tries to make data transmission and performs a carrier sense, as shown in FIG. 1B the mobile stations MS3, MS5-MS10, and MS11 can detect empty slots since only the mobile stations MS1, MS2, and MS4 occupy a packet in the air of the mobile station MS11, whereby data transmission is enabled. At this time, since the communication areas of the mobile stations MS3, MS5-MS10 are very narrow, no collision of data occurs. Although the mobile station MS11 is located in the communication areas of the mobile stations MS1, MS2, and MS4, the mobile stations MS1 and MS2 are moving at a low speed and the mobile station MS4 is not in the approaching direction. Therefore, data transmission is made with the first transmission power. When the speed of the mobile stations becomes high and the communication areas become wide, the moving speed is high and a time for locating in the communication area of a single moving station is short. Therefore, it is unlikely that the communication area assumes a situation where too many mobile stations exist in the area.

Thus, in the present invention, each mobile station controls a transmission output of its own by the "mobile speed information", forms a communication area according to its own status, and stores the "moving speed information" and the "moving direction information" in transmission data to be transmitted. Also, each mobile station detects the "moving speed information" and the "moving direction information" from received data from another mobile station which has been received in a time zone during which its own station is not making data transmission. When the value of "moving speed information" is higher than a preset threshold, and only when the "moving direction information" detected indicates the approaching direction for the traveling direction of its own, the communication area is enlarged, thereby enabling a packet occupancy per unit time to be reduced and the minimum communication area to be formed. Thus, it is possible to further increase efficiency of a CSMA method broadcast communication which can also avoid the data collision of mobile stations.

Since it is enough to transmit information of its own station to another mobile station close to its own station when the moving speed of its own station is low, data transmission is made with a transmission power proportional to the moving speed of its own station, so that an optimum communication range according to the moving speed can be secured.

Also, when another mobile station is moving at a high speed in approaching direction even if its own mobile station is moving at a low speed, the communication area according to the moving speed of the other mobile station is secured in order to avoid a collision between the mobile stations by informing the existence of its own station to the other station. Thus, regardless of the moving speed of its own station, the transmission power can be increased, the communication range is expanded, and a proper communication area can be formed.

Accordingly, when all of the mobile stations make transmission with the same power, each of the mobile stations forms the communication area required even if too many mobile stations exist in the communication area. Therefore, an extra signal is not transmitted far, and a vacant hour is easily found even if a carrier sense is performed, which contributes to an efficient broadcast communication using the CSMA method.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which.

DESCRIPTION OF THE EMBODIMENTS

Arrangement of Embodiment

FIG. 2

Figure 1A:
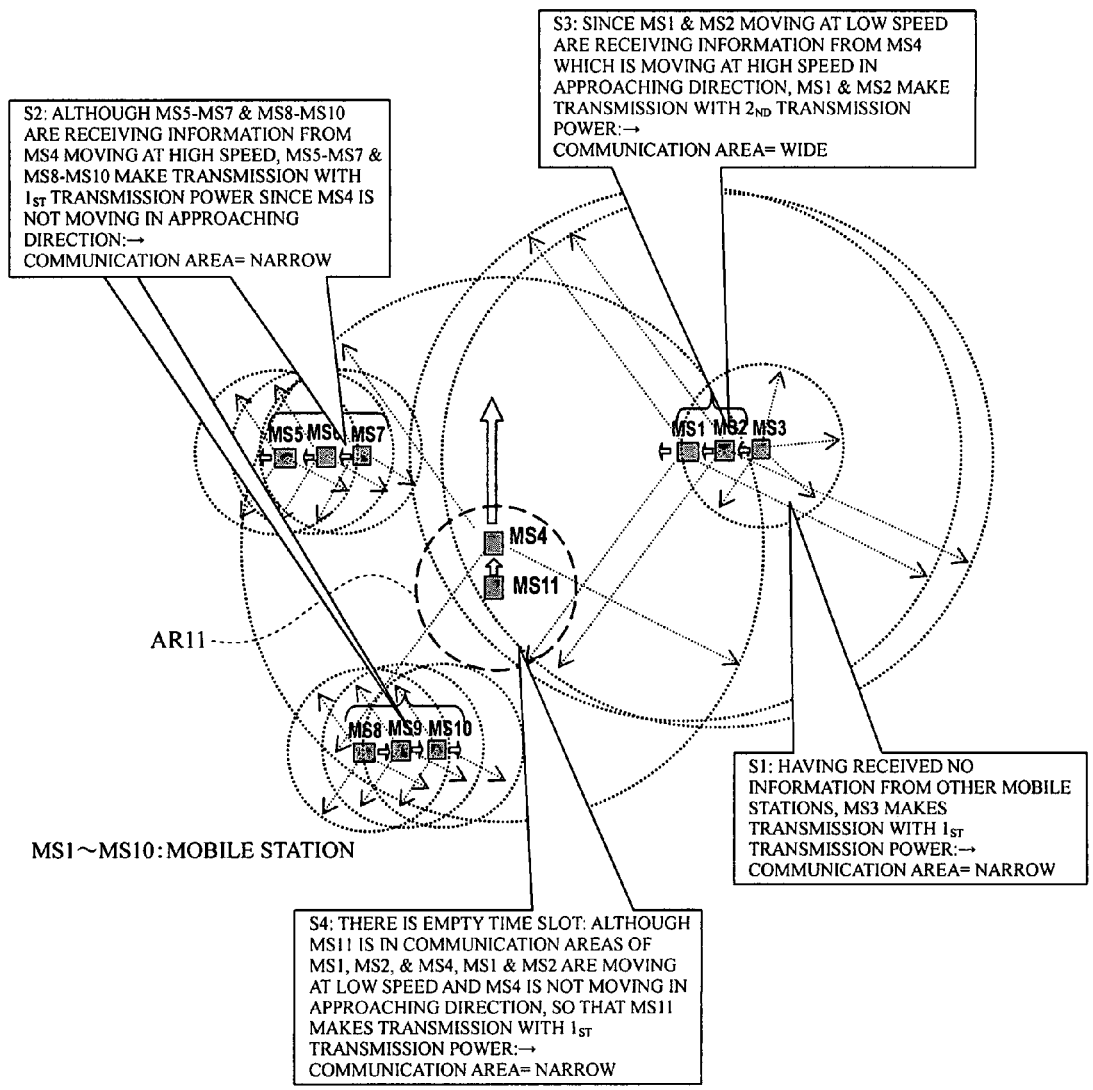
FIGS. 1A and 1B are diagrams showing a concept of a transmission control method and device according to the present invention.
Figure 1B:
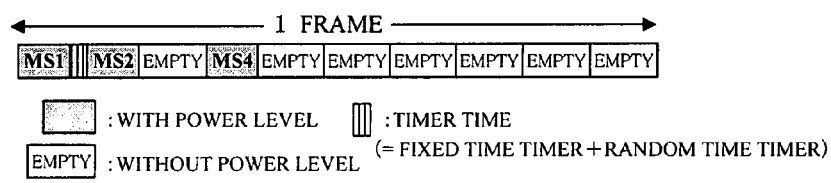
Figure 2:
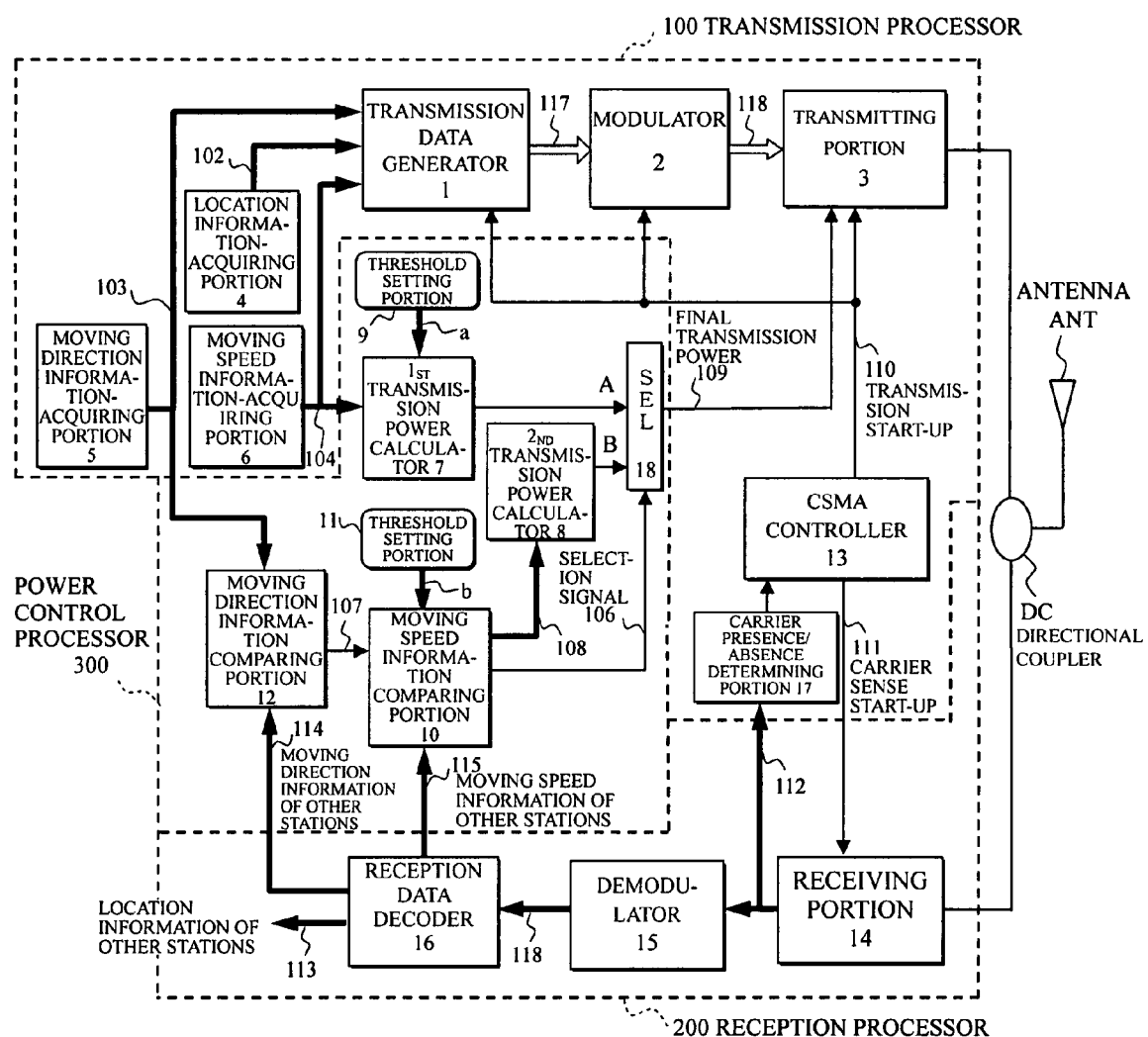
FIG. 2 is a block diagram showing an arrangement of each mobile station to which a transmission control method and device according to the present invention are applied.

FIG. 2 shows an arrangement of each mobile station realizing a transmission control method and device according to the present invention, which is composed of a transmission processor 100, a reception processor, and a power control processor 300 briefly.

The transmission processor 100 is composed of a location information-acquiring portion 4 of its own station, a moving direction information-acquiring portion 5 of its own station, a moving speed information-acquiring portion 6 of its own station, a transmission data generator 1 which inputs information 102-104 acquired by the information-acquiring portions 4-6 and generates transmission data 117, a modulator 2 which modulates the data 117 generated by the transmission data generator 1, a transmitting portion 3 which amplifies the power of modulation data 118 outputted from the modulator 2 and which transmits the amplified data through a directional coupler DC and an antenna ANT, a CSMA controller 13 which starts up transmission for the transmission data generator 1, the modulator 2, and the transmitting portion 3, and a carrier presence/absence determining portion 17 which provides information of carrier presence/absence to the CSMA controller 13.

Also, the reception processor 200 is composed of a receiving portion 14 which takes out a reception signal from the directional coupler DC, a demodulator 15 which demodulates reception data 118 from a reception signal 112 taken out by the receiving portion 14, and a reception data decoder 16 which decodes data modulated by the demodulator 15. The reception data decoder 16 outputs moving direction information 114 of other stations and moving speed information 115 of other stations, and also outputs location information 113 of other stations. It is arranged that the output signal 112 of the receiving portion 14 is also transmitted to the carrier presence/absence determining portion 17, and a carrier sense start-up signal 111 of the CSMA controller 13 is provided to the receiving portion 14.

The power control processor 300 is provided with a $1_{ST}$ transmission power calculator 7 which compares the moving speed information 104 acquired by the moving speed information-acquiring portion 6 in the transmission processor 100 with a threshold "a" from a threshold setting portion 9 and which sequentially calculates a first transmission power A to be outputted, a moving direction information comparing portion 12 which compares the moving direction information 103 from the moving direction information-acquiring portion 5 in the transmission processor 100 with the moving direction information 114 of other stations decoded by the reception data decoder 16 in the reception processor 200, a moving speed information comparing portion 10 which outputs moving speed information 108 of other stations and a selection signal 106 based on a comparison result 107 at the moving direction information comparing portion 12, and a comparison result between a threshold "b" set by a threshold setting portion 11 and the value of the moving speed information 115 of other stations, a $2_{ND}$ transmission power calculator 8 which sequentially calculates a second transmission power by the moving speed information 108 from the moving information comparing portion 10, and a selector 18 which inputs an output signal A outputted from the $1_{ST}$ transmission power calculator 7 and a calculation result B calculated by the $2_{ND}$ transmission power calculator 8, and which selects either A or B according to the selection signal 106 from the moving speed information comparing portion 10. It is arranged that the output of the selector (SEL) 18 is provided to the transmitting portion 3 in the transmission processor 100 as a final transmission power 109.

Hereinafter, the function of each portion will be described in detail.

In the transmission processor 100, the location information-acquiring portion 4 is a functional portion for storing location information of its own station detected by a GPS receiver or the like. The moving direction information-acquiring portion 5 is a functional portion for acquiring a moving direction of its own station, and a functional portion for calculating and acquiring a moving direction of its own station from the location information by the GPS receiver or the like to be outputted. For example, a total 8 bits of information (1, 0 information of 2 bits) indicating four cardinal points and information (1, 0 information of 6 bits) indicating what degree of the angle the moving direction is shifted clockwise from the direction of the four cardinal points is outputted as a signal 102.

The moving speed information-acquiring portion 6 is a phase speed information-acquiring portion, which acquires speed information of a mobile unit on which a mobile station is mounted (e.g. 1, 0 information of 9 bits) to be outputted as a signal 104.

In the transmission data generator 1, the information 102-104 is mapped into a data format communicated between actual mobile stations, so that transmission data 117 is generated.

The generated transmission data 117 is modulated by the modulator 2, converted into a carrier by the transmitting portion 3, so that the carrier is transmitted by the antenna ANT through the directional coupler DC after being amplified.

Meanwhile, the transmission data generator 1, the modulator 2, and the transmitting portion 3 are started up by a transmission start-up control signal 110 transmitted when it is found that there is an available transmission timing (there is no other carrier) in the air as a result of a carrier sense by the CSMA controller 13.

The CSMA controller 13 starts up the carrier sense by the signal 111 for the receiving portion 14. By reception electric field level information of the signal 112 obtained as a result of the carrier sense, the CSMA controller 13 generates the transmission start-up signal 110 and controls the start-up of each transmission system functional portion based on an output of the carrier presence/absence determining portion 17 which determines presence/absence of packet of another station.

In the reception processor 200, the data received by the receiving portion 14 and demodulated by the demodulator 15 is decoded by the reception data decoder 16. As a result, the moving direction information 114 of other stations and the moving speed information 115 of other stations within the received packet is transmitted to the power control processor 300. Also, the location information 113 of other stations is also outputted from the reception data decoder 16, thereby enabling a prediction of risk of collision or the like by the location and the speed of other stations in the same way as the prior art example.

In the power control processor 300, either a value of a first transmission power which will be described later or a second transmission power is selected for a final transmission power based on a result of comparison between information of its own station and information of other stations.

Thus, the moving direction information comparing portion 12 compares the moving direction information signal 103 of its own station and the moving direction information 114 of other stations from the reception data decoder 16, and transmits a result 107 of determining whether or not the direction is the approaching direction to the moving speed information comparing portion 10. The moving speed information comparing portion 10 compares the threshold "b" set by the threshold setting portion 11 with the moving speed information signal 115 of other stations, and outputs the moving speed information 108 of other stations and the selection signal 106 based on the comparison result 107 from the comparing portion 12. The $1_{ST}$ transmission power calculator 7 has a first algorithm for comparing the moving speed information 104 of its own station from the moving speed information-acquiring portion 6 with the threshold "a" set by the threshold setting portion 9 to determine the first transmission power A. The $2_{ND}$ transmission power calculator 8 has a second algorithm for determining a second transmission power B based on the speed information read from the data received. The selector 18, as mentioned above, selects either the first transmission power A or the second transmission power B based on the selection signal 106 to be provided to the transmitting portion 3 as the final transmission power 109.

Operation of Embodiment

FIGS. 3-5

Figure 3:
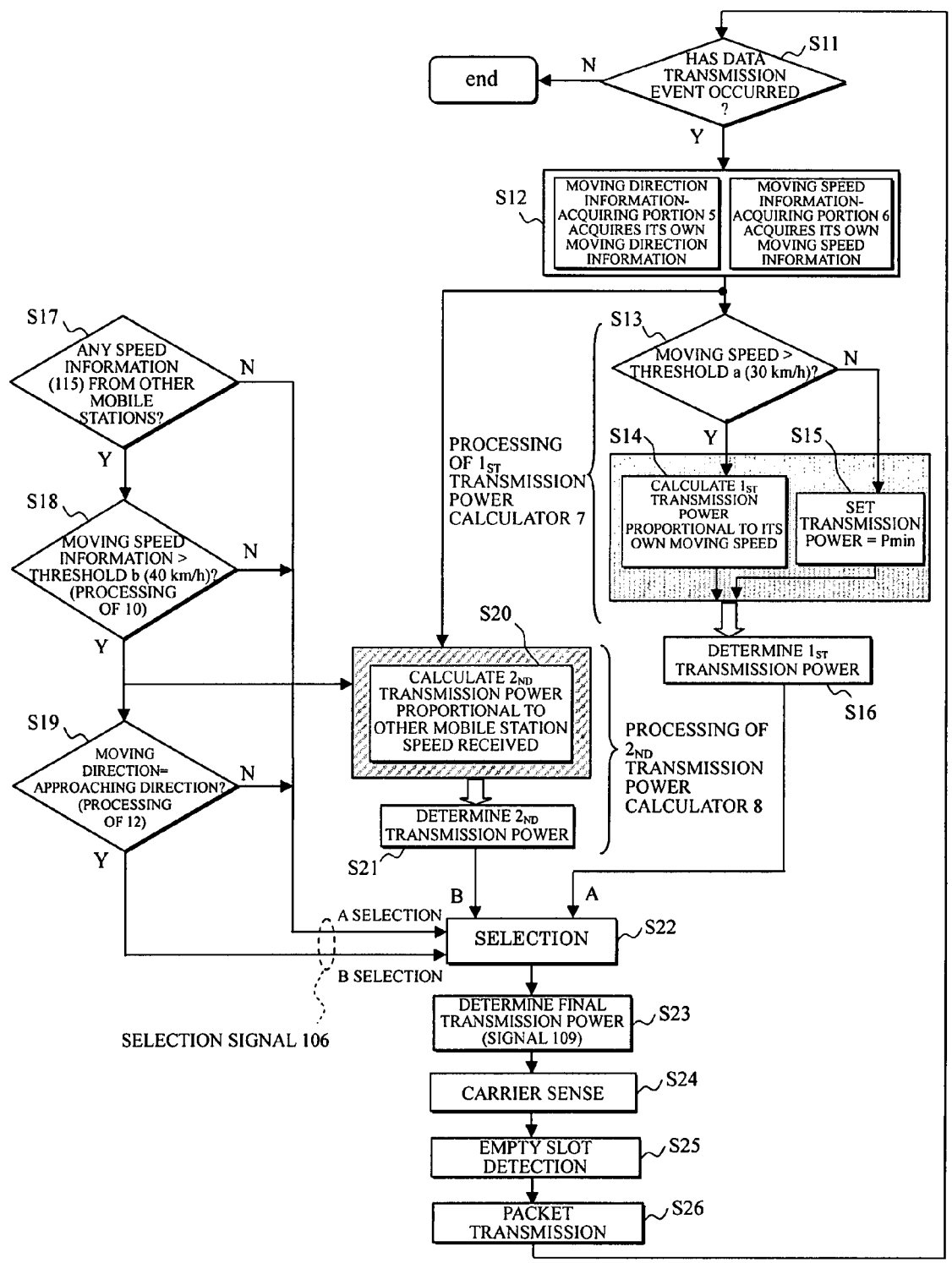
FIG. 3 is a flowchart showing an operation example of each mobile station.

An operation example of each mobile station having the arrangement shown in FIG. 2 will now be described referring to FIGS. 3-5. It is to be noted that in fact this processing is constantly performed while no transmission is made. Also, signals received are ones from a plurality of mobile stations, so that this processing is performed for each signal.

When a data transmission event has occurred (at step S11), the transmission processor 100 acquires the moving direction information and the moving speed information of its own station respectively by the moving direction information-acquiring portion 5 and the moving speed information-acquiring portion 6 (at step S12). The moving speed information 104 is inputted to the $1_{ST}$ transmission power calculator 7. The $1_{ST}$ transmission power calculator 7 determines whether or not the input value 104 exceeds the threshold "a" set by the threshold setting portion 9. As a result, in case the moving speed>the threshold "a" (e.g. 30 km/h), the first transmission power A according to the moving speed is obtained based on the first transmission power calculation algorithm (at step S14). In case the moving speed≦the threshold "a", a power (Pmin) for covering the minimum communication area determined by the system is determined as a transmission power (at step S15).

Figure 4:
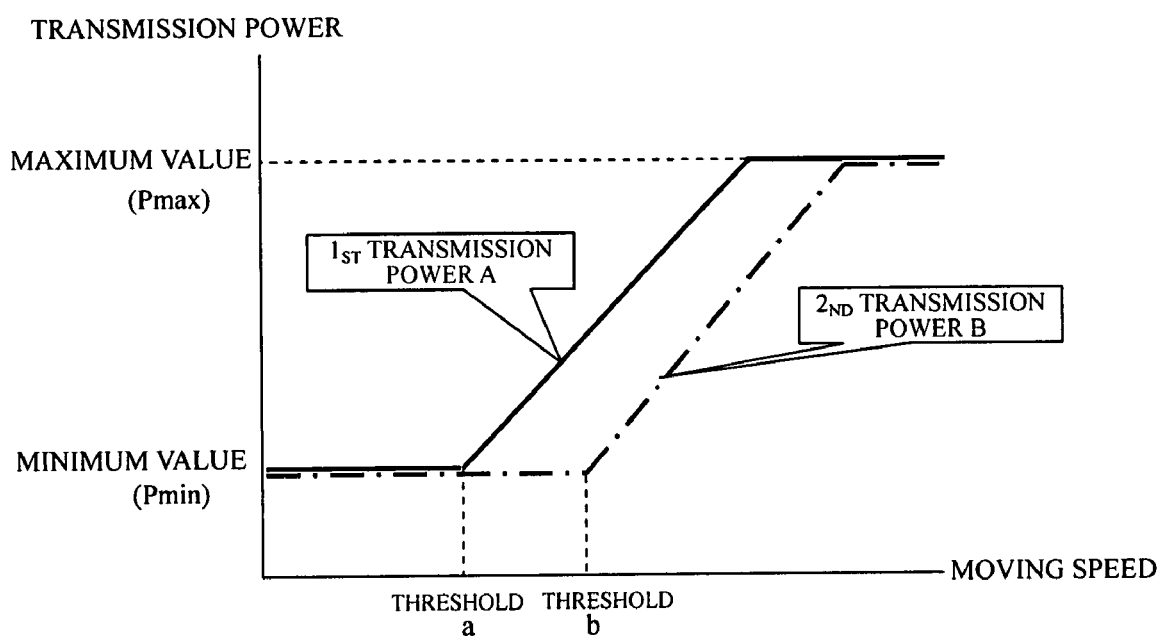
FIG. 4 is a graph chart showing a relationship between a moving speed and a transmission output in the present invention.

As a result, the first transmission power A shown by a solid line in FIG. 4 is determined (at step S16). It is to be noted that the maximum value (Pmax) is a transmission power covering the maximum communication area which the mobile station is required to cover. The first transmission power A determined is inputted to the selector 18 determining the final transmission power.

On the other hand, in the reception processor 200, the reception data decoder 16 takes out the moving direction information 114 and the moving speed information 115 from the reception data to be provided to the power control processor 300, every time data is received from another station in a time zone during which its own station is not making a transmission. In the power control processor 300, when providing the mobile speed information 115 from the reception data decoder 16 (at step S17), the moving speed information comparing portion 10 compares the moving speed information 115 with the threshold "b" (e.g. 40 km/h) set in the threshold setting portion 11 (at step S18).

As a result, when it is determined that the moving speed>the threshold "b", the second transmission power B (indicated by a dashed-dotted line in FIG. 4) is calculated by the $2_{ND}$ transmission power calculator 8 to be made the final power (at steps S20 and S21). It is to be noted that this second transmission power B also has the minimum power Pmin and the maximum power Pmax in the same way as the first transmission power A. When it is determined that the moving speed≦the threshold B (at step S18) and that there is no input of the moving speed information 115 (there is no reception data) (at step S17), the first transmission power A is selected. Also, whether or not the moving speed information comparing portion 10 is activated is determined by the output 107 from the moving direction information comparing portion 12. Namely, the moving direction information comparing portion 12 compares the moving direction information 103 of its own station with the moving direction information 114 of the reception data, and activates the moving speed information comparing portion 10 only when it is the approaching direction.

Accordingly, the first and second transmission powers A and B are provided to the selector 18, and only when the moving direction information of its own station and another station indicates approaching direction (at step S19), and the moving speed of the other mobile station exceeds the threshold "b" (at step S18), the second transmission power B is selected as a final transmission power (at steps S22 and S23).

It is to be noted that after the final transmission power is determined in this way, the carrier presence/absence determining portion 17 performs a carrier sense (at step S24), detects an empty slot (at step S25), and makes a packet transmission (at step S26). Upon the packet transmission, the moving direction information, moving speed direction, and location information of its own station is transmitted with the above-mentioned first transmission power A or B. While FIG. 3 showing the transmission power control operation does not show the location information, a mobile station having received the location information as information 113 from another mobile station can preliminarily know a risk of collision by referring to the location information with the moving speed, since the location information 113 indicates a location of a mobile station of a transmitting source.

Figure 5:
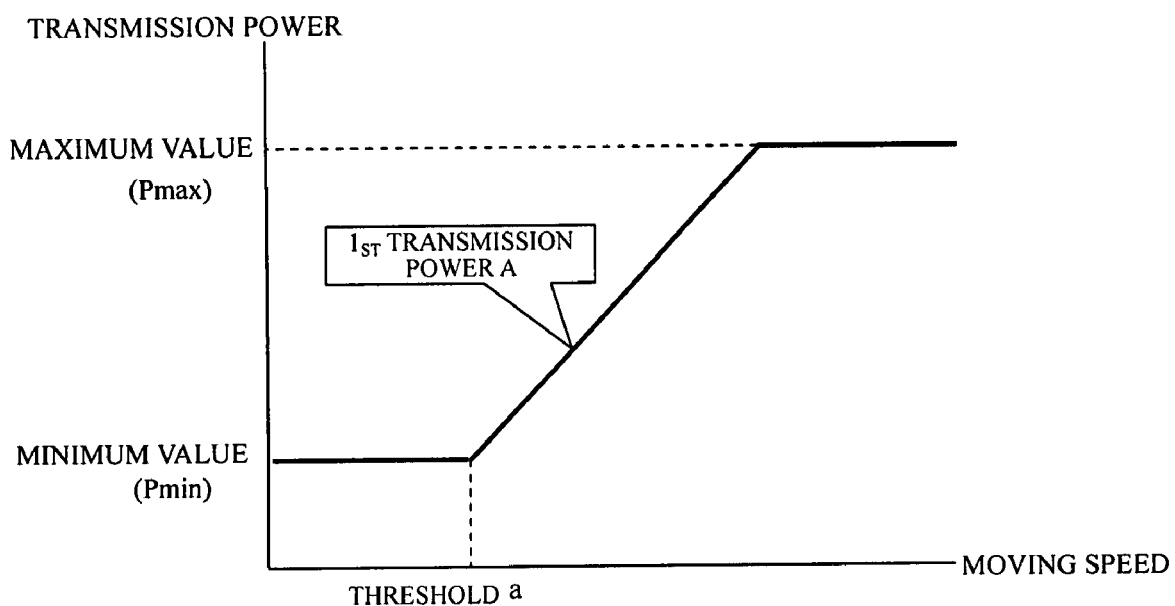
FIG. 5 is a graph chart showing a power control example [1] (where there is no reception signal or the reception signal is received but "moving speed<threshold "a"" or "moving direction is not approaching direction") of the present invention.
Figure 6:
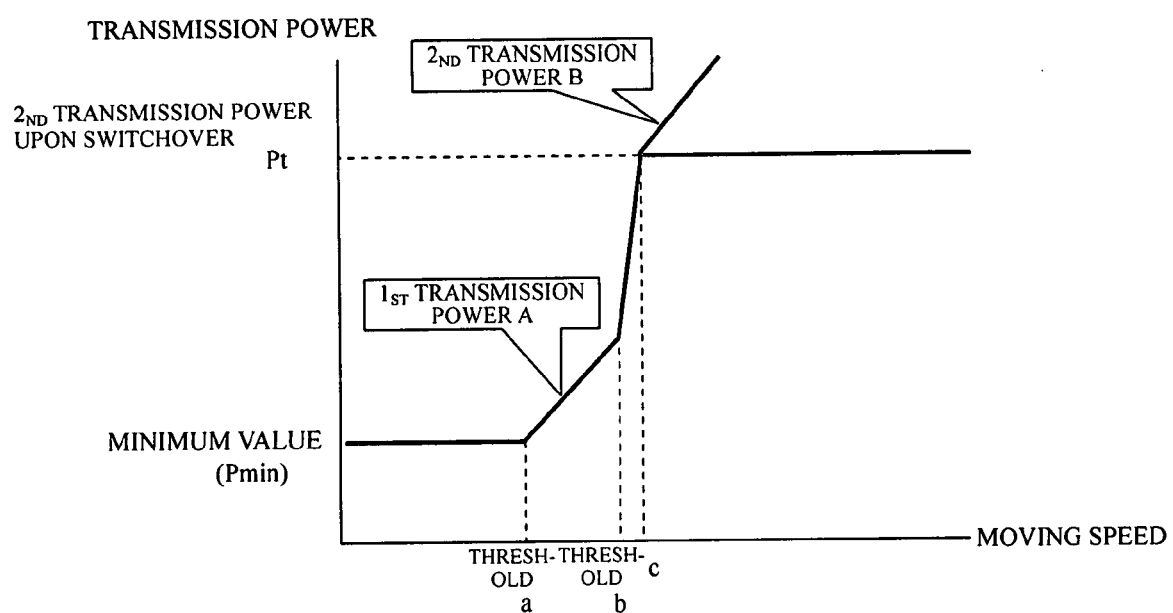
FIG. 6 is a graph chart showing a power control example [2] (where "moving speed=high and moving direction=approaching direction") of the present invention.
Figure 7:
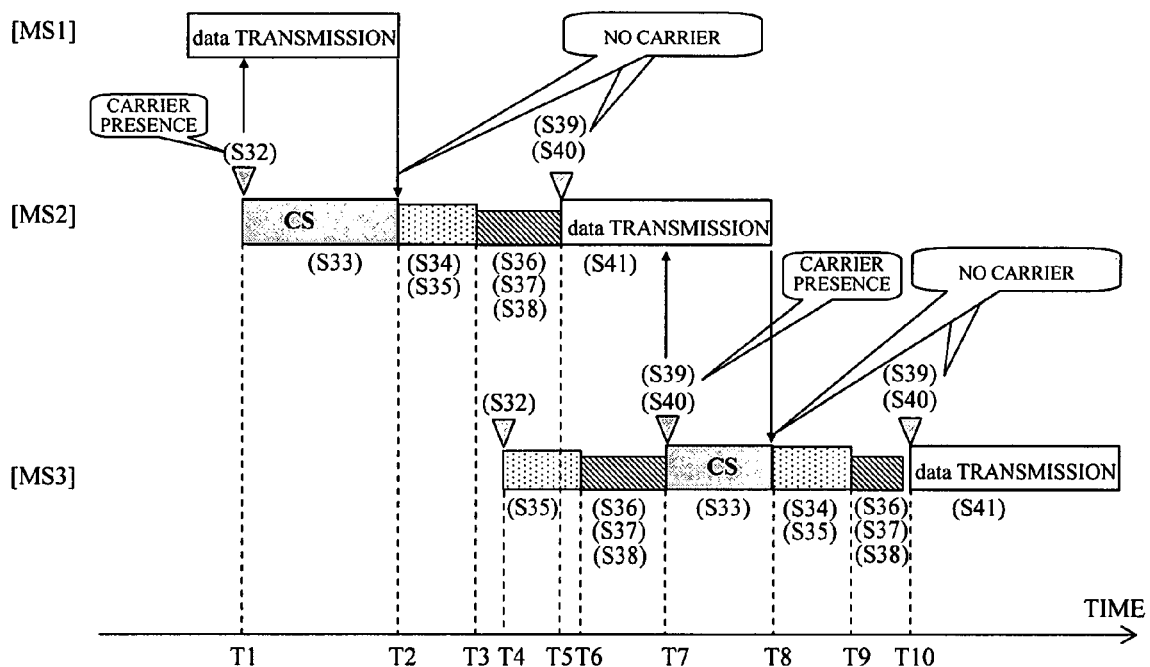
FIG. 7 is a diagram showing a concept of a generally known CSMA method.
Figure 8:
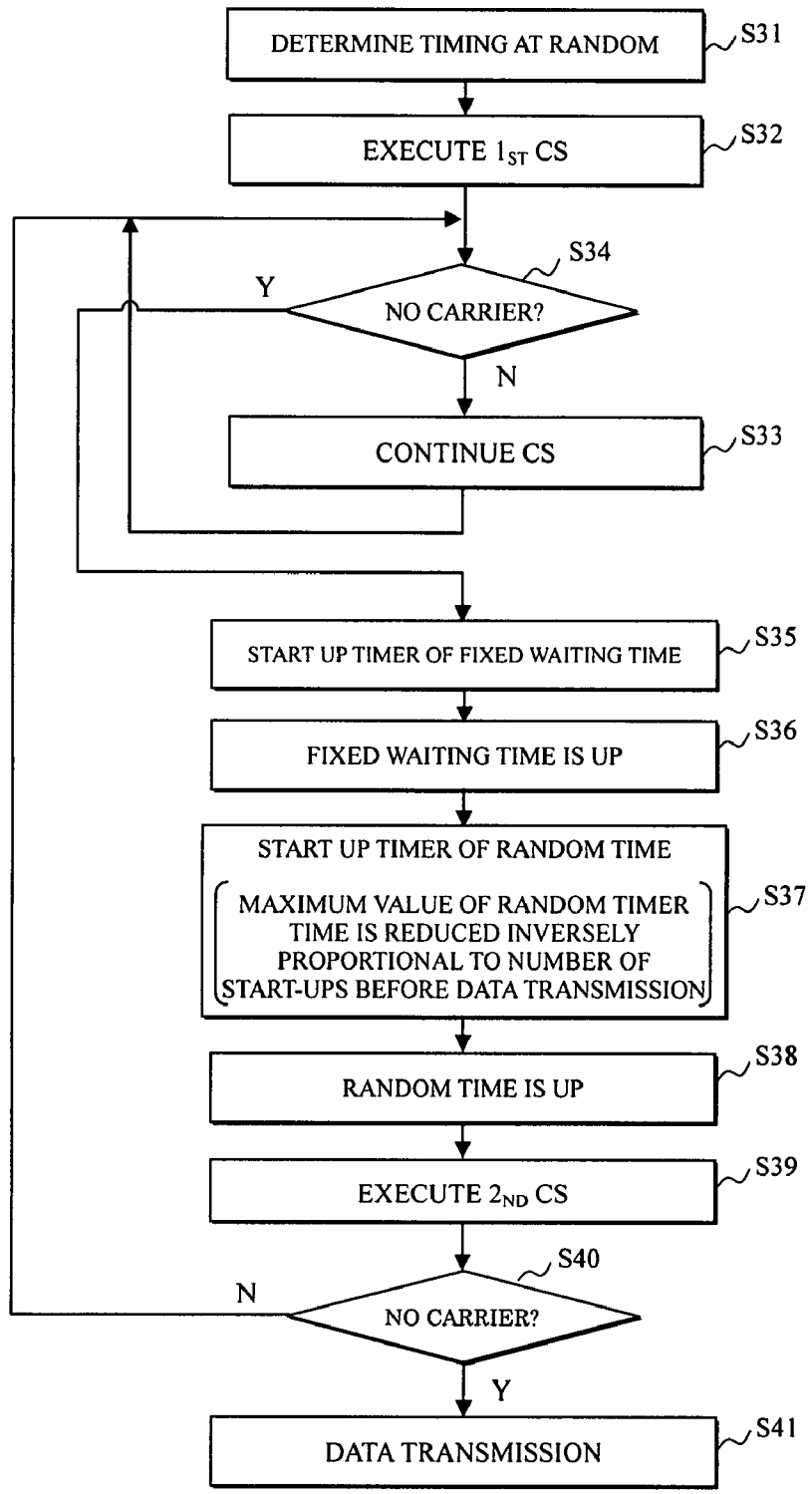
FIG. 8 is a flowchart showing a data transmission of the CSMA method shown in FIG. 7.
Figure 9A:
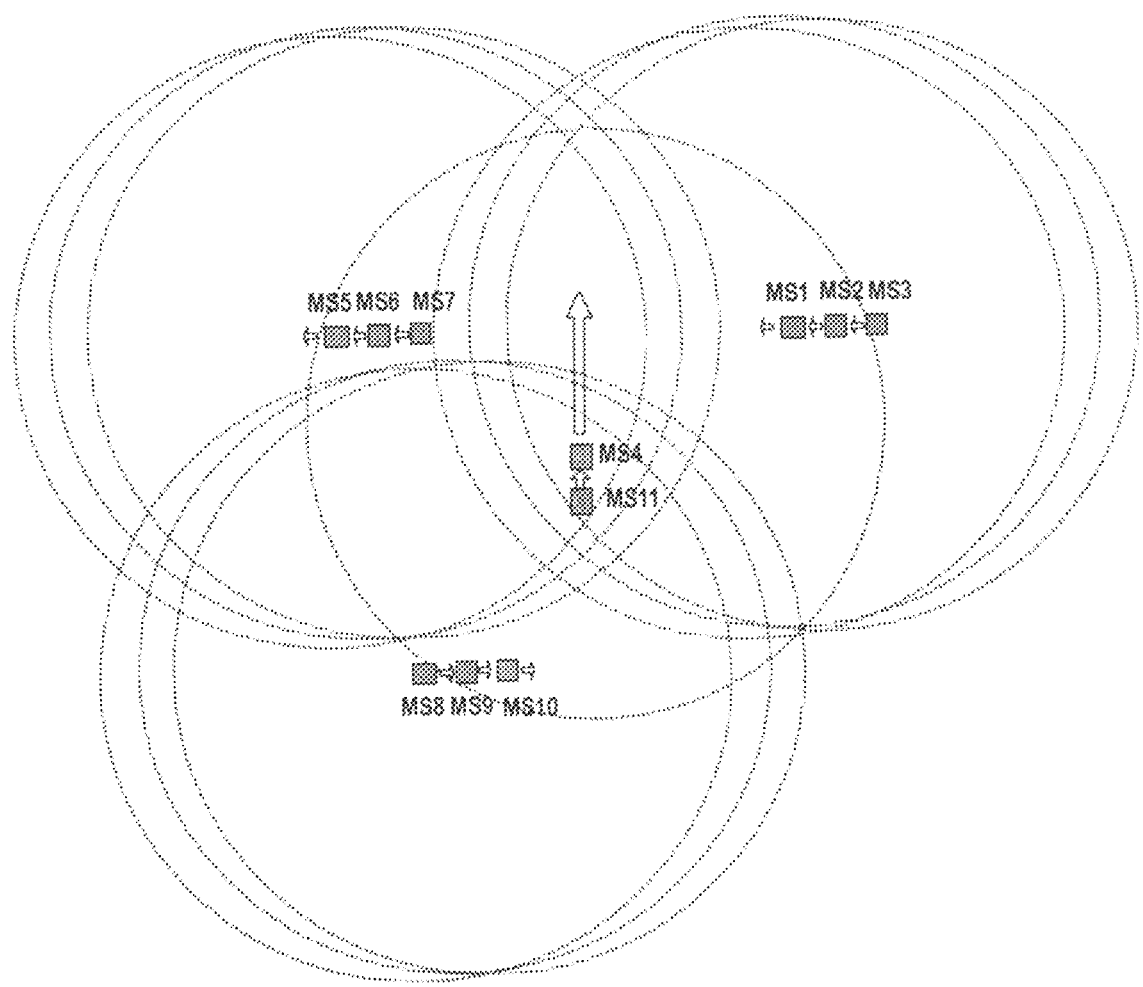
FIGS. 9A and 9B are diagrams showing a concept of a prior art example.
Figure 9B:
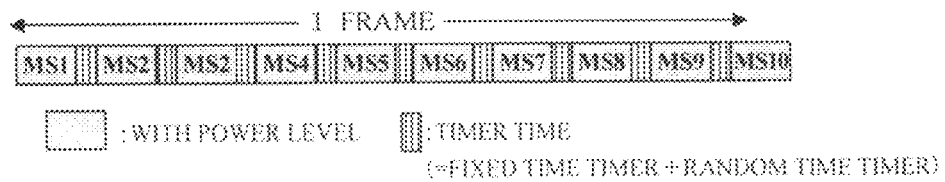

FIGS. 5 and 6 show an operation of an actual power control.

FIG. 5 shows a relationship between the moving speed and the transmission power either in the case where no reception data from another mobile station exists (at step S17), the moving direction is not the approaching direction even if the reception data exists (at step S19), or the moving speed is equal to or less than the threshold even if the reception data exists (at step S18), where a calculation result A at the $1_{ST}$ transmission power calculator 7 assumes the final power.

FIG. 6 shows a state of switching over the transmission power to the second transmission power B when its own station making data transmission with the first transmission power A at first gradually enhances its moving speed and receives a signal from another mobile station in the approaching direction whose moving speed exceeds the threshold "b". It is to be noted that in this case its own mobile station enhances the moving speed with time. Pt in this case indicates a calculation result of the $2_{ND}$ transmission power calculator 8 at the time when the moving speed received from the other station exceeds the threshold "b", and the transmission power is gradually changed in a slope fashion so as to reach Pt by taking the time during which the moving speed changes from "b" to "c". It is to be noted that the slope is not related to the increasing degree of the speed of its own station but indicates the temporal increase of the output, and the time is only expressed by "the time during which the speed changes from "b" to "c"" in FIG. 6.

It is to be noted that the present invention is not limited by the above-mentioned embodiments, and it is obvious that various modifications may be made by one skilled in the art based on the recitation of the claims.

What is claimed is:

1. A transmission control method transmitting information of a mobile station to another mobile station by a Carrier Sense Multiple Access (CSMA) access method comprising:
    acquiring and holding moving speed information and location information of the mobile station; and
    transmitting the moving speed information and the location information with a predetermined minimum transmission power until a moving speed of the mobile station exceeds a first threshold, and of transmitting the moving speed information and the location information with a first transmission power proportional to the moving speed when the moving speed of the mobile station exceeds the first threshold;
    wherein the acquiring and holding includes acquiring and holding moving direction information of the mobile station in addition to the moving speed information and the location information, and the transmitting includes transmitting the moving direction information in addition to the moving speed information and the location information,
    the method further comprising receiving and holding moving speed information and moving direction information of the another mobile station, and switching the first transmission power to a second transmission power proportional to a moving speed of the another mobile station, and of transmitting the moving speed information and the moving direction information if the moving speed of the another mobile station exceeds a second threshold higher than the first threshold and a moving direction of the another mobile station is an approaching direction to the mobile station while the mobile station is not making transmission with the moving speed of the mobile station exceeding the first threshold.

2. The transmission control method as claimed in claim 1, further comprising transmitting the moving speed information and the moving direction information with the first transmission power when the moving direction of the another mobile station is not an approaching direction to the mobile station and even if the moving speed of the another mobile station is equal to or more than the second threshold.

3. The transmission control method as claimed in claim 1, further comprising of increasing a transmission power in a slope fashion upon switchover from the first transmission power to the second transmission power.

4. A transmission control device transmitting information of a mobile station to another mobile station by a Carrier Sense Multiple Access (CSMA) access method comprising:
    a first means acquiring and holding moving speed information and location information of the mobile station; and
    a second means transmitting the moving speed information and the location information with a predetermined minimum transmission power until a moving speed of the mobile station exceeds a first threshold, and transmitting the moving speed information and the location information with a first transmission power proportional to the moving speed when the moving speed of the mobile station exceeds the first threshold;

wherein the first means includes a means acquiring and holding moving direction information of the mobile station in addition to the moving speed information and the location information, and the second means includes a means transmitting the moving direction information in addition to the moving speed information and the location information, the device further comprising a third means receiving and holding moving speed information and moving direction information of the another mobile station, and a fourth means switching the first transmission power to a second transmission power proportional to a moving speed of the another mobile station, and transmitting the moving speed information and the moving direction information if the moving speed of the another mobile station exceeds a second threshold higher than the first threshold and a moving direction of the another mobile station is an approaching direction to the mobile station while the mobile station is not making transmission with the moving speed of the mobile station exceeding the first threshold.

5. The transmission control device as claimed in claim 4, further comprising a fifth means transmitting the moving speed information and the moving direction information with the first transmission power when the moving direction of the another mobile station is not an approaching direction to the mobile station and even if the moving speed of the another mobile station is equal to or more than the second threshold.

6. The transmission control device as claimed in claim 4, further comprising a fifth means increasing a transmission power in a slope fashion upon switchover from the first transmission power to the second transmission power.

* * * * *